(12) United States Patent
Steinsland

(10) Patent No.: US 9,880,308 B2
(45) Date of Patent: Jan. 30, 2018

(54) PARAVANE SYSTEM

(71) Applicant: PGS GEOPHYSICAL AS, Oslo (NO)

(72) Inventor: Tore Steinsland, Bergen (NO)

(73) Assignee: PGS GEOPHYSICAL AS, Oslo (NO)

( * ) Notice: Subject to any disclaimer, the term of this patent is extended or adjusted under 35 U.S.C. 154(b) by 67 days.

(21) Appl. No.: 14/918,801

(22) Filed: Oct. 21, 2015

(65) Prior Publication Data

US 2016/0306065 A1 Oct. 20, 2016

Related U.S. Application Data

(60) Provisional application No. 62/149,746, filed on Apr. 20, 2015.

(51) Int. Cl.
*B63B 1/38* (2006.01)
*B63G 8/42* (2006.01)
*G01V 3/15* (2006.01)
*B63B 21/56* (2006.01)

(52) U.S. Cl.
CPC .................. *G01V 3/15* (2013.01); *B63B 1/38* (2013.01); *B63B 21/56* (2013.01); *B63G 8/42* (2013.01)

(58) Field of Classification Search
CPC .. B63G 8/42; B63G 8/425; B63B 1/38; B63B 1/387; B63B 21/66; B63B 21/663; B63B 21/666

See application file for complete search history.

(56) References Cited

U.S. PATENT DOCUMENTS

| | | | |
|---|---|---|---|
| 6,415,730 B1 * | 7/2002 | Barker | B63B 21/663 114/243 |
| 6,575,106 B1 * | 6/2003 | Whitener | B63B 1/20 114/291 |
| 6,982,926 B2 * | 1/2006 | Tenghamn | B63B 1/38 367/153 |
| 7,042,803 B2 | 5/2006 | Kutty et al. | |
| 8,267,031 B2 | 9/2012 | Austad et al. | |
| 2004/0066707 A1 | 4/2004 | Tenghamn et al. | |
| 2011/0103179 A1 | 5/2011 | Vageskar et al. | |
| 2013/0139742 A1 | 6/2013 | MacQuin et al. | |

* cited by examiner

*Primary Examiner* — Andrew Polay
(74) *Attorney, Agent, or Firm* — Patterson & Sheridan, LLP

(57) ABSTRACT

A paravane is described that includes a float member; a baffle coupled to the float member, the baffle comprising one or more fluid ports disposed at a flow-facing side of the baffle; and a fluid source coupled to the baffle by a conduit. The fluid is a drag-reducing fluid, which may be a gas. The fluid is flowed to the flow-facing side of the baffle to reduce towing force.

24 Claims, 5 Drawing Sheets

PARAVANE SYSTEM

CROSS-REFERENCE TO RELATED APPLICATIONS

This application claims benefit of U.S. Provisional Patent Application Ser. No. 62/149,746, filed Apr. 20, 2015, entitled "Deflector System", which is incorporated herein by reference.

BACKGROUND

Certain aspects of the present disclosure generally relate to the field of geophysical surveying and may have particular applicability to components used in marine settings.

In geophysical prospecting in a marine environment, sources and receivers of various types are used to understand the geography of the earth below the water. In a typical surveying configuration, the sources and receivers are towed by cables behind a vessel. The cables are typically maintained in relatively fixed orientations to provide clear interpretation of the results. A common method of maintaining the orientations of the cables is to attach them to a spreading device that extends laterally between the cables. Deflectors at the end of the spreading device, commonly called paravanes, provide an outward force as the assembly moves through water, to keep the spreading device extended.

The paravanes are often attached to the vessel using ropes or cables. In some cases the paravanes may be 10 meters or more in length. At times, forces on the paravanes, for example from rough seas, may produce a towing force on the ropes or cables used to tow the paravanes that exceeds a tolerance strength of the rope or cable. In some cases the forces may be of short duration, but damage is done to the rope or cable nonetheless. A technique is needed for managing stresses on ropes and cables used to tow paravanes for marine geophysical acquisition.

BRIEF DESCRIPTION OF THE DRAWINGS

So that the manner in which the features of the present disclosure can be understood in detail, a description of the disclosure may be had by reference to aspects, some of which are illustrated in the appended drawings. It is to be noted, however, that the appended drawings illustrate only typical aspects of this disclosure and are therefore not to be considered limiting of its scope, for the disclosure may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

It is to be understood the present disclosure is not limited to particular devices or methods, which may, of course, vary. It is also to be understood that the terminology used herein is for the purpose of describing particular aspects only, and is not intended to be limiting. As used herein, the singular forms "a", "an", and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." Terms such as "coupled", "coupling", and "couplable" refer to being directly or indirectly connected.

This disclosure may have applications in marine surveying, in which one or more energy sources are used to generate wavefields, and sensors—either towed or ocean bottom—receive energy generated by the sources and affected by the interaction with the subsurface formation. Likewise, this disclosure may have applications in marine electromagnetic (EM) surveying, in which one or more EM field sources are used to generate EM fields, and EM sensors—either towed or ocean bottom—receive EM energy generated by the EM sources and affected by the interaction with the subsurface formations.

Figure 1:
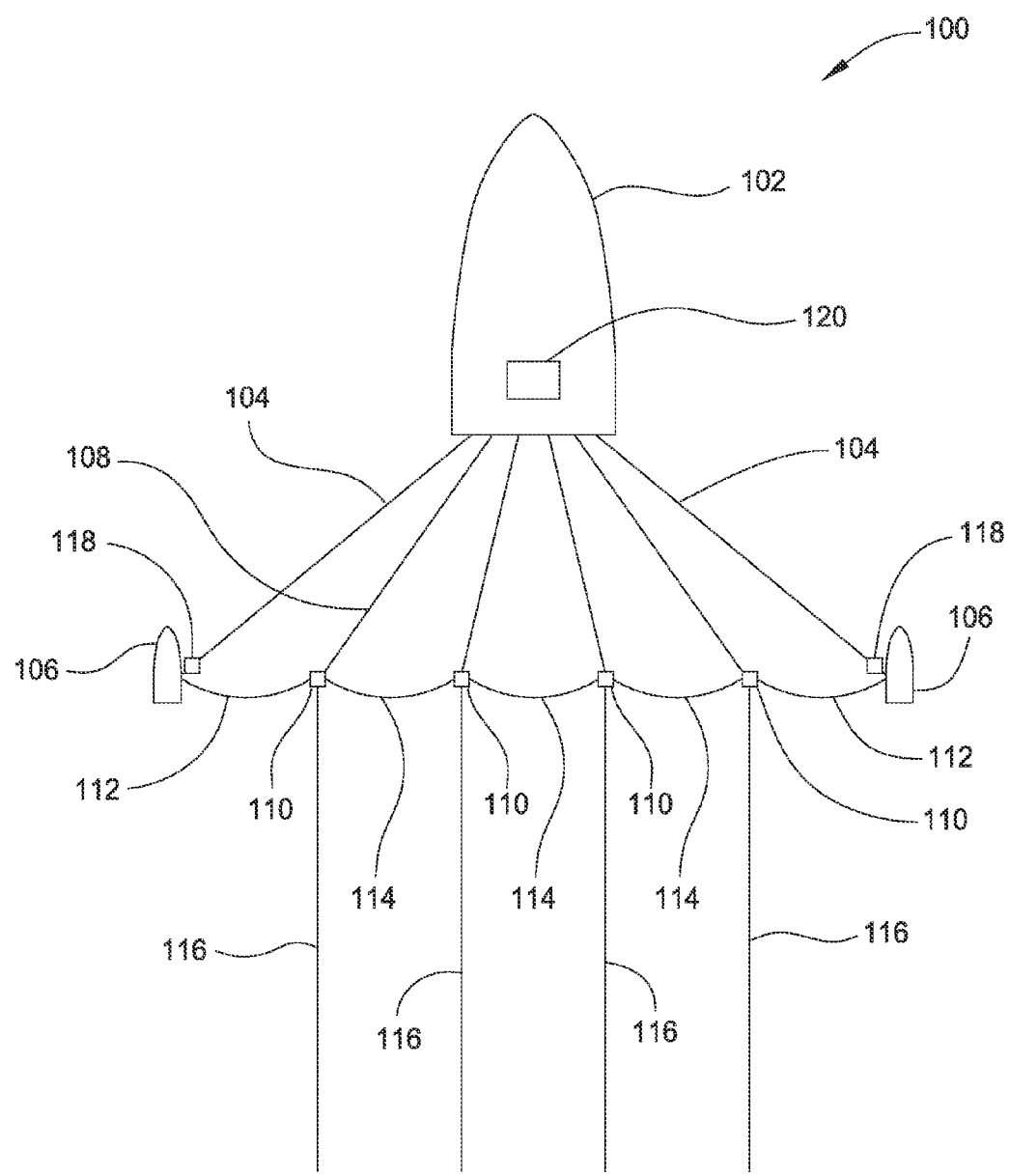
FIG. 1 is an example activity diagram showing a data acquisition scheme in a marine context.

FIG. 1 is an example activity diagram showing a data acquisition scheme 100 in a marine context. A vessel 102 typically tows an acquisition apparatus by one or more lines 104, which may be ropes or cables. The lines 104 are typically coupled to an aft region of the vessel 102 and to a plurality of float devices 110 and paravanes 106. The float devices 110 provide a near-surface fixation for active cables 116 coupled to the float devices 110. The active cables 116 may include energy sources and/or detectors, communication devices, recording devices, locating devices, power generation devices, positioning devices, or other operating devices. The active cables 116 may also include passive components such as spacers, float members, ballast members, passive positioners, or other passive components.

The float devices 110 are connected by cable 114 that provide a maximum separation of the float devices 110. An outer float device on each side is connected to a paravane 106 by an outer cable 112. The paravane 106 provides a lateral force on the outer cable 112 that separates the float device 110 to the limit of the cables 114.

Figure 2A:
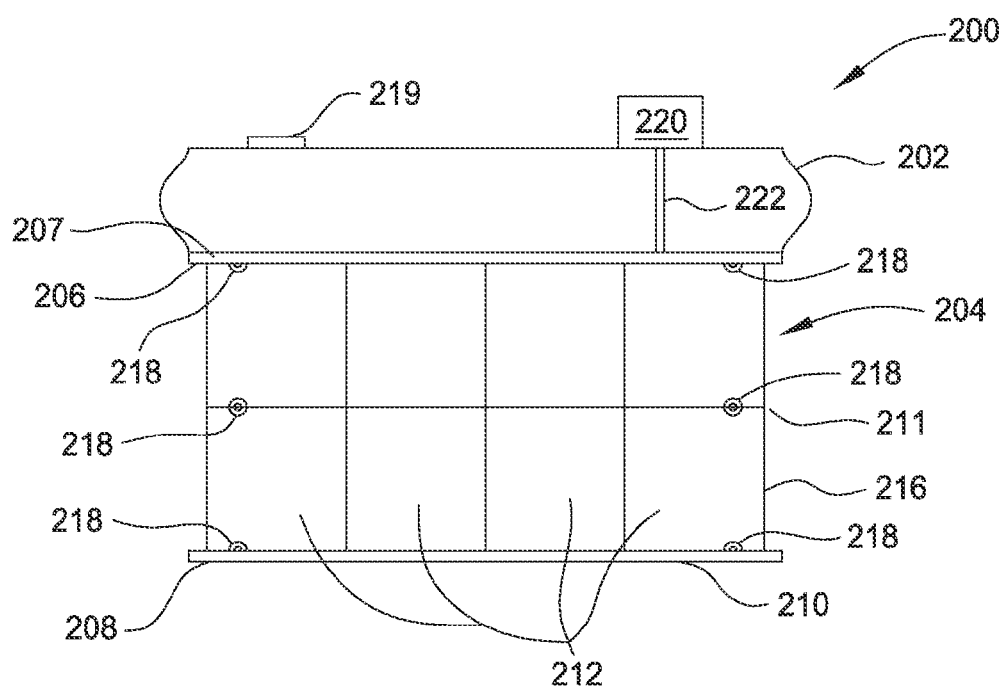
FIG. 2A is a schematic side view of a paravane according to one embodiment.

FIG. 2A is a schematic side view of a paravane 200 according to one embodiment. The paravane 200 has a float member 202 and a baffle 204 coupled to the float member 202. The float member 202 may be an elongated structure for easy towing through a fluid, and may be hollow, partially hollow, or solid. The float member 202 may be made, wholly or in part, of a rigid, deformable, or flexible material. The float member 202 may have a rigid shell, for example made of aluminum, and an interior made of, or filled with, a buoyant material such as a polymer foam. The float member 202 may have features for adjusting buoyancy of the float member, for example to submerge the acquisition apparatus to a target depth. Such features may include actuated elevators and inlet and outlet ports to take on or expel ballast from an interior of the float member 202. For example, the float member 202 may have a polymer foam interior with a void space that allows ballast to be inboarded into the void space for adjusting buoyancy of the float member 202.

The baffle 204 has a first end 206 and a second end 208. The first end 206 of the baffle 204 is typically coupled to the float member 202, being either directly attached to the float member 202 or coupled by an extended coupling, such as a cable, rod, or plate. In the embodiment of FIG. 2A, the first end 206 of the baffle 204 includes a coupling plate 207, which is fastened to the float member 202 and supports the float member 202 and the other components of the baffle 204. The second end 208 may be free of any coupling, or may be coupled to an end member 210. The baffle 204 may be attached to the float member 202 by any convenient means, such as fastening with fasteners such as bolts or screws, or adhering with adhesive applied between contact surfaces of the baffle 204 and the float member 202. If the baffle 204 and the float member 202 are made of compatible materials, such as aluminum or thermoplastic, they may be adhered by welding or fusing.

The baffle 204 has a foil 212 and may include a fender 214 at a flow-facing side 216 of the baffle 204. The foil may be any convenient material with structural strength, such as plastic or metal, for example aluminum.

The paravane 200 typically has one or more connections 218 for connecting ropes or cables for towing. The connections 218 may be attached to the flow member 202, the baffle 204, or both. In the embodiment of FIG. 2A, the connections 218 are connected to the baffle 204. In most cases, the paravane 200 has at least two connections, a first connection attached near the flow member 202, for example at the first end 206 of the baffle 204, and a second connection attached to the end member 210, or directly to the second end 208 of the baffle 204 if an end member is not used. A third connection may be attached near a center 211 of the baffle 204 in some cases.

The baffle 204 may have one or more foils 212, each of which extends from the first end 206 to the second end 208 of the baffle. In the embodiment of FIG. 2A, the baffle 204 has four foils 212, but there may be any convenient number of foils 212. Each foil 212 has a flow-facing side 216 that receives incident fluid flow when the paravane 200 is towed through a fluid, such as water. One or more of the foils 212 has a plurality of fluid ports 302 (FIG. 3A) disposed at the flow-facing side 216 of the foil 212 of the baffle 204. A fluid source 220 is coupled to the baffle 204 by a conduit 222 that provides a drag-reducing fluid to the fluid ports 302, as further described below. The fluid source 220 may be attached to the paravane 200 by attaching to the float member 202 or the baffle 204, or the fluid source 220 may be detached from the paravane 200, for example on the vessel 102 (FIG. 1). Alternately, as described further below, the fluid source 220 may be located inside the float member 202. The conduit 222 may also be located inside the paravane 200, for example inside the float member 202 and/or the baffle 204, as further described below.

A port 219 may be disposed on an outside surface of the float member 202 to provide a means for introducing material to, or removing material from, an interior of the float member 202. The port 219 may be used to control an amount of a ballast material in the float member 202, or the port 219 may be used to control an amount of a material in a fluid reservoir, such as a gas reservoir, inside the float member 202.

Figure 2B:
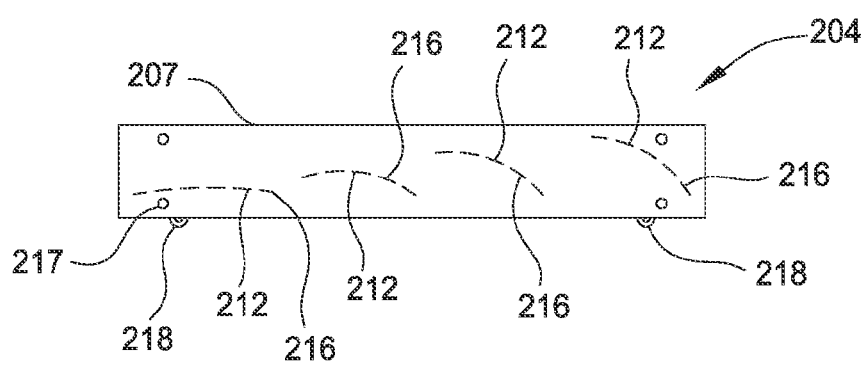
FIG. 2B is a top view of a baffle of the paravane of FIG. 2A.

FIG. 2B is a top view of the baffle 204 of FIG. 2A looking down on the coupling plate 207. Two connections 218 are shown attached to the coupling plate 207 on a vessel-facing side of the coupling plate 207 to facilitate towing. The foils 212 are shown in phantom, and are generally arranged to optimize function of the baffle 204 when towed through a fluid. A plurality of holes 217 is shown in the coupling plate 207 to facilitate attachment of the coupling plate 207 to another body such as the float member 202.

Figure 3A:
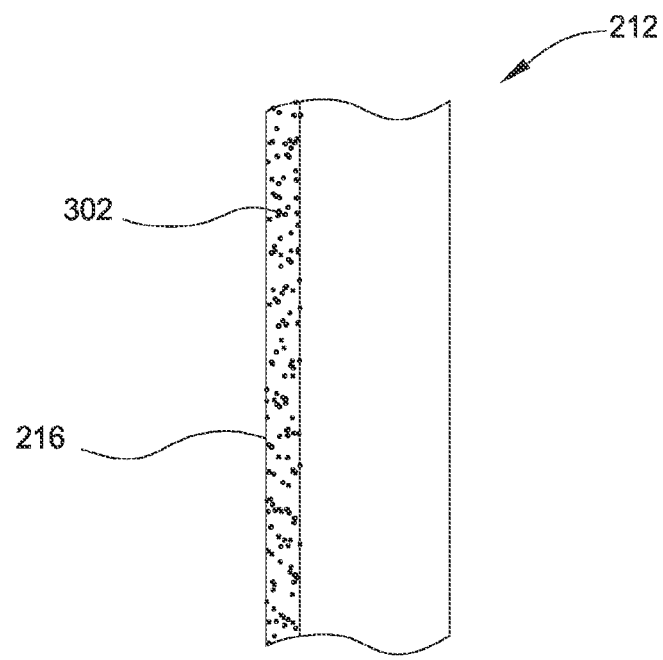
FIGS. 3A and 3B are detail views of a flow-facing side of a foil of the paravane of FIG. 2A and the baffle of FIG. 2B according to one embodiment.

FIG. 3A is a detail view of a flow-facing side 216 of a foil 212 of FIGS. 2A and 2B according to one embodiment. A plurality of fluid ports 302 may be disposed at the flow-facing side 216 of one or more foils 212 of the baffle 204. The fluid ports 302 may be openings formed in the baffle 204 at or near the flow-facing side 216, or the fluid ports 302 may be nozzles integrated into the baffle 204 at the flow-facing side 216 or attached to the baffle 204 at the flow-facing side 216. As such, the fluid ports 302 may be disposed through the baffle 204, a foil 212 of the baffle 204, or any portion thereof. In one aspect, the plurality of fluid ports 302 may define a perforated area of the baffle 204 at the flow-facing side 216, wherein the fluid ports 302 are distributed along the length of the baffle 204 in a single line of perforations or with a desired lateral distribution. For example, a plurality of fluid ports 302 may form a grill or mesh at the flow-facing side 216 of the baffle 204 distributed along the length thereof.

Figure 3B:
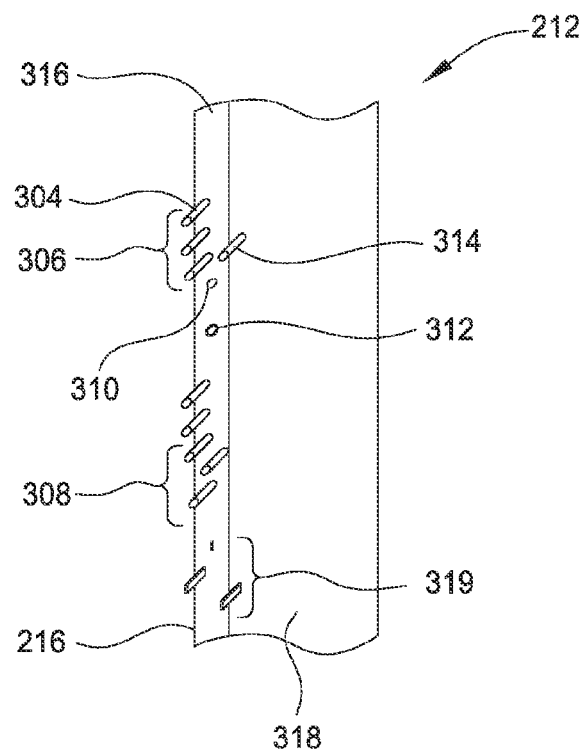

Alternately, the plurality of fluid ports 302 may be a plurality of nozzles integrated into the baffle 204. FIG. 3B is a detail view of a flow-facing side of a foil 212 of FIGS. 2A and 2B according to another embodiment. The embodiment of FIG. 3B includes a plurality of nozzles 304. Various configurations of nozzles are shown in the embodiment of FIG. 3B to demonstrate various ways nozzles may be arranged in different embodiments. The nozzles 304 may be distributed along the length of the foil 212 of the baffle 204 in a single line, as shown in the configuration 306, or staggered according to a desired pattern, as shown in the configuration 308. The nozzles may have openings that are flush with the surface of the foil 212 as shown with the nozzle 310, recessed within the foil 212, as shown with the nozzle 312, or projecting from the surface of the foil 212, as with the other nozzles 304. The nozzles may also be attached to an outside surface of the foil 212, as shown with the nozzle 314.

The foils 212 in FIGS. 3A and 3B may be used in the paravane 200 and the baffle 204. Referring to FIG. 3B, but applicable to all embodiments of the foils 212 depicted in FIGS. 2A and 2B, the foil 212 may have a fender 316 at the flow-facing side 216 of the foil 212. The fender 316 may be a durable material capable of surviving collisions with dense objects with little or no damage at velocities up to about 10 m/sec. The foil 212 may also have a tail 318 made of a strong material that may be different from the material of the fender 316. In some embodiments, the fender 316 may be aluminum and the tail 318 may be plastic.

The fluid ports 302 may be any shape. Most of the fluid ports 302 shown in the figures have a round or circular profile, but any convenient shape may be used. At 319 in FIG. 3B, nozzles and openings are shown with elongated shapes, which may be slit-like. For example, nozzles or openings such as those at 319 may be air knives or gas knives. Such elongated shapes may be used for all the fluid ports 302 of a baffle 204, or only some fluid ports 302 of a baffle. A first plurality of fluid ports 302 of a baffle 204 or a foil 212 may have a first shape, or a first profile, and a second plurality of fluid ports 302 of the baffle 204 or the foil 212 may have a second shape, or a second profile, different from the first shape or the first profile. For example, the first profile may be a circular profile, while the second profile is an elongated profile, for example a slit-like profile.

The fluid ports 302 are generally oriented to flow a fluid to a region adjacent to the flow-facing side 216 of the baffle 204 in the general direction of movement of the paravane 200. The fluid ports 302 may be aligned to flow the fluid at an angle with respect to the direction of movement of the paravane 200 or with respect to a flotation plane of the float member 202, if desired. For example, one or more of the fluid ports 302 may be oriented to flow a fluid at an upward angle, a downward angle, or a lateral angle with respect to the direction of movement of the paravane 200. The angle of fluid flow through the fluid ports 302 may help orient the baffle 204 and/or the paravane 200 by providing a force on the baffle 204 and/or the paravane 200. In another example, the fluid ports 302 may include a first plurality of fluid ports 302, each having a flow axis that forms a first acute angle with respect to the direction of movement of the paravane 200, and a second plurality of fluid ports 302, each having a flow axis that forms a second acute angle, different from the first acute angle, with respect to the direction of movement of the paravane 200.

Size and spacing of the fluid ports 302 may be selected to provide a desired fluid flow pattern at the flow-facing side 216 of the baffle 204. The fluid ports 302 may have diameter between about 0.01 mm and about 2 mm, for example between about 0.1 mm and about 0.5 mm. Diameter of the fluid ports 302 may be varied to provide a non-uniform fluid flow pattern, if desired. For example, fluid ports 302 at a greater depth on the baffle 204 may be larger or smaller than those at a lesser depth to provide a gradient fluid flow pattern. In another example, fluid ports 302 near a center of the baffle 204 may be larger or smaller than those at a periphery of the baffle 204 to provide a defined center-edge non-uniform flow pattern. In another example, the fluid ports 302 may be arranged in clusters, where a cluster of fluid ports 302 may include ports of different size, such as a first plurality of ports having a first size and a second plurality of ports having a second size different from the first size, wherein the first plurality may surround the second plurality, be surrounded by the second plurality, be adjacent to the second plurality, or be interspersed with the second plurality.

Spacing of the fluid ports 302 may be uniform or non-uniform according to the needs of a particular embodiment. The fluid ports 302 may be evenly distributed in a linear pattern, such as a Cartesian pattern, pitched Cartesian pattern, hexagonal pattern, and the like, or unevenly distributed. The fluid ports 302 may alternately be clustered in groupings, which may themselves be uniformly or non-uniformly spaced along the baffle 204. For example, a cluster of fluid ports 302 may include large and small ports, such as one or more large ports ringed by smaller ports, if desired. In another example, a foil 212 of a baffle 204 may have a plurality of fluid ports 302 formed in a flow-facing side 216 of the foil 212, wherein the plurality of fluid ports 302 comprises a first group of ports and a second group of ports all having substantially the same dimension, wherein each port of the second group of ports is spaced apart from a neighboring port of the second groups of ports by a distance less than three times the diameter of the port, and wherein each port of the first group of ports is spaced apart from a neighboring port of the first group of ports by a distance at least five times the diameter of the port. In this example, a port B is a neighboring port to another port A if a line from the center of port A to the center of port B crosses no other ports.

In embodiments where a large number of fluid ports 302 are provided, such as in a mesh or grill, density of the fluid ports 302 along the foil 212 of a baffle 204 may be according to any desired pattern. Density of the fluid ports 302 may vary from top to bottom of the foil 212, from the center of the foil 212 to either or both extremities, or may alternate in a repeating pattern along the foil 212. Overall area of the fluid ports 302 affects fluid flow characteristics of the foil 212, and overall area of fluid ports 302 may be adjusted by changing the pattern, spacing, size, and shape of the fluid ports 302.

In operation, a drag reducing fluid is flowed through the fluid ports 302 to reduce drag on the paravane 200 as the paravane 200 moves through a flow medium such as water. In the case where the flow medium is water, the drag reducing fluid may be a gas, such as air or nitrogen, which may be selected for drag reducing properties, such as low density or viscosity. In one aspect, a foam may be formed at the flow-facing side 216 of the baffle 204 to reduce drag on the paravane 200. The gas dispersed in the water at the flow-facing side 216 is generally dispersed in bubbles having dimension from about 0.05 mm to about 5 mm, such as from about 0.1 mm to about 2 mm, for example about 0.5 mm, which may form a foam. The bubbles are dispersed with a velocity that provides a bubble zone at the flow-facing side 216. The bubble zone has a thickness that is influenced by the velocity of gas flow through the baffle 204. The thickness of the bubble zone is selected to provide a reduced drag zone into which the paravane 200 may move to reduce towing force on the paravane 200. Thickness of the bubble zone at the flow-facing side 216 of each foil 212 is generally between about 1 mm and about 10 cm, such as between about 5 mm and about 8 cm, for example about 5 cm. Thickness below this range results in little improvement in drag on the paravane 200, while thickness above this range results in high flow-resistive force from ejecting fluid into the flow medium against the flow direction, which increases towing force.

Figure 4A:
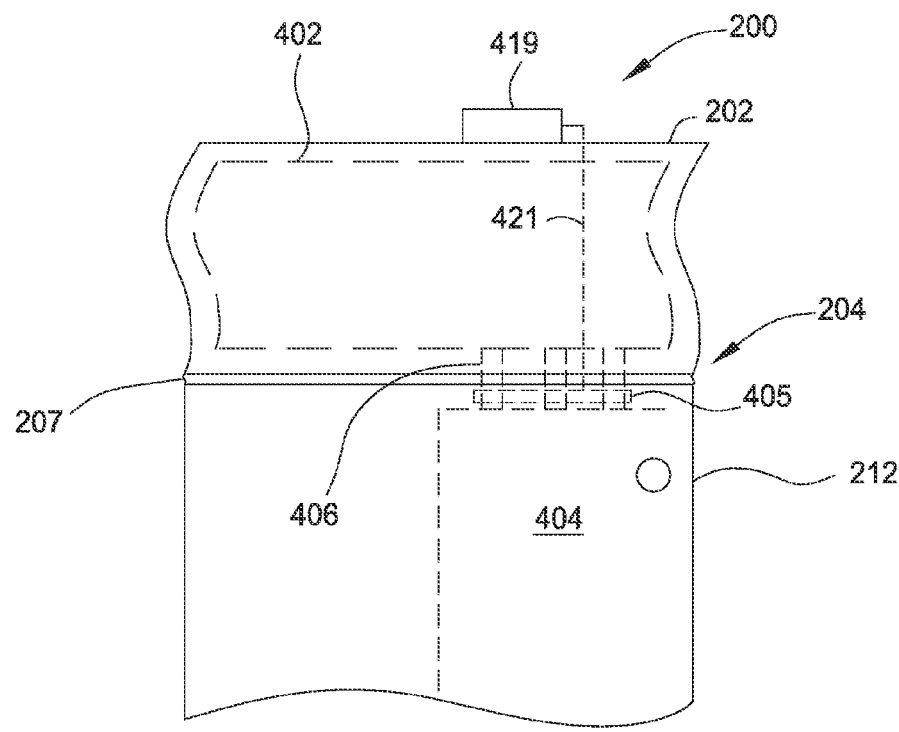
FIG. 4A is a detail view of a portion of the paravane of FIG. 2A.

The baffle 204 may have hollow portions. FIG. 4A is a detail view of a portion of the paravane 200 of FIG. 2A. A foil 212 is visible coupled to the float member 202 by the coupling plate 207. A plenum 404 may be provided inside the foil 212 of the baffle 204 as a conduit for distributing the drag reducing fluid to the fluid ports 302. Alternately, a plurality of conduits may be provided through and/or along the baffle 204 to the fluid ports 302. In general, one or more conduits may be provided along or through the baffle 204, or any foil 212 of the baffle 204, or any portion thereof for routing drag-reducing fluid to the baffle 204. The fluid may be provided to the baffle 204, and any conduits therein, from a reservoir 402 disposed in the float member 202. The reservoir 402 may be an empty space within the float member 202, which may be a void space different from any ballast space that may be disposed inside the float member. One or more conduits 406 may deliver the drag reducing fluid from the reservoir 402 into the plenum 404. In FIG. 4A, the plenum 404, reservoir 402, and conduits 406 are shown in phantom.

The conduits 406 may be tubes that extend from the float member 202. The conduits 406 may be inserted through openings in the coupling plate 207 into openings in the foil 212 to assemble the paravane 200. Alternately, the conduits 406 may be tubes that extend from the foil 212, are inserted through openings in the coupling plate 207 into openings in the float member 202. Sealing may be accomplished by any convenient means, such as adhesive, tape, welding, insertion of a sealing member such as a compliant seal ring, or any other means. It should be noted that the conduits 406 may also be routed around the coupling plate 207, rather than through the coupling plate 207, so that the conduits 406 are externally routed to the plenum 404.

Figures 4B, 4C:
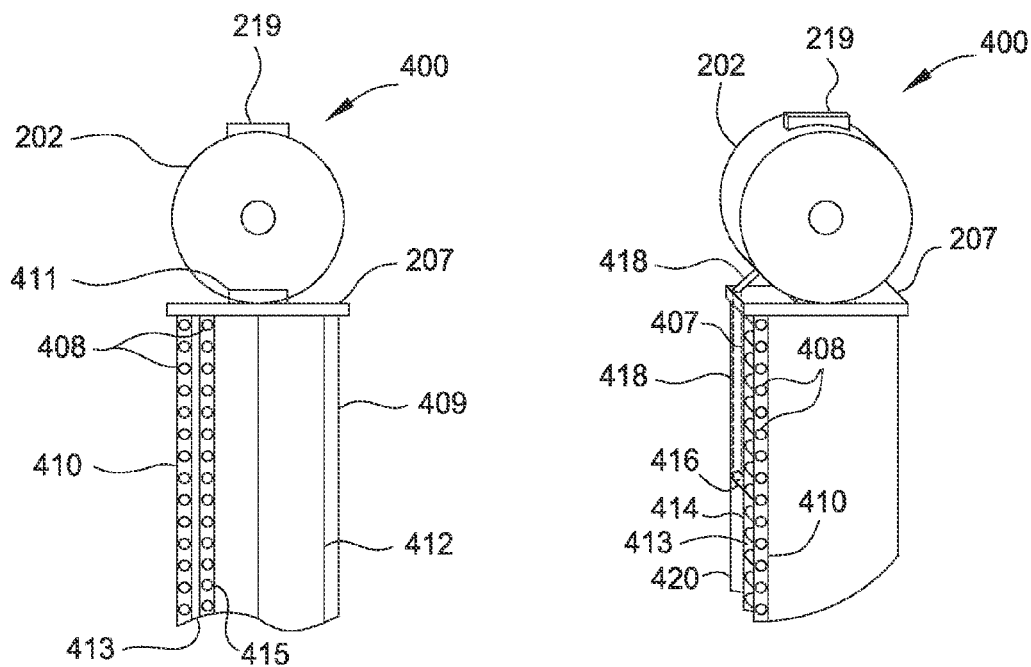
FIG. 4B is a detailed front view of a paravane featuring external gas conduits according to another embodiment.
FIG. 4C is a detail perspective view of the paravane of FIG. 4B.

The conduits may alternately be routed entirely external to the foil 212 so that a plenum 404 is not used. FIG. 4B is a detailed front view of a paravane 400 featuring external gas conduits 408. A foreground foil 412 is shown, with a portion of a first background foil 409 and a second background foil 410 visible. Gas conduits 408 are shown on the visible flow-facing sides of the foreground foil 412 and the second background foil 410, other foils being obscured in the view of FIG. 4B. The gas conduits 408 may be positioned along the flow-facing side of each foil, the foreground foil 412, the first and second background foils 409, 410, and any foils not visible in FIG. 4B. The gas conduits 408 are shown with openings 415 for flowing a drag-reducing fluid along the flow-facing side of each foil toward a flow direction of the paravane 400. The openings 415 may be holes in the gas conduits 408, or nozzles extending from the gas conduits 408 in the flow direction. The gas conduits 408 may be routed through or around the coupling plate 207, as described above, to couple to a reservoir inside the float member 202 (FIG. 4A). The openings 415 may have any of the size, shape, and arrangement characteristics described above in connection with FIGS. 3A and 3B. The gas conduits 408 may be attached to the foil by any convenient means, such as bolting, welding, or adhering with an adhesive material.

As alluded to above, the drag-reducing fluid may be provided to the reservoir in the float member 202 through a port 219. In the case of a gas, a compressor may be coupled to the port 219 to pressurize the reservoir prior to deploying the paravane, and the pressurized gas may be ratably dispersed through the foils 212, 409, 410, and 412. In embodiments, the compressor can be located, for example, on a work boat (not shown) and can pressurize the reservoir after the paravane is deployed. In embodiments, the drag-reducing fluid may be provided from an external fluid source, that is external to the paravane 400, while the paravane 400 is being towed by vessel 102 (FIG. 1). For example, a compressor (not shown) can be located on vessel 102 (FIG. 1) and can communicate the drag-reducing fluid to the conduit 408 by way of a conduit running, for example, along line 104 (FIG. 1).

FIG. 4C is a detail perspective view of the paravane 400 of FIG. 4B. The gas conduits 408 proceed from the foil 412 to a manifold 413, which supplies drag-reducing fluid to all the conduits 408 and openings 415. The manifold 413 is coupled to a feed line 416, which supplies the manifold 413. The feed line 416 may join the manifold 413 at any convenient location, for example at the center or near the top. A support 420 extends from the float member 202, for example from the coupling plate 207, along the flow-facing side of the baffle 400. The foil 412 may be coupled to the support 420, although such coupling is not visible in the view of FIG. 4C. A conduit 418 may be routed through the support 420 to couple the feed line 416 to the reservoir 402 (FIG. 4A) in the float member 202. The conduit 418 may also be routed along the support 420. The control valve 405 (FIG. 4A) may be coupled to the conduit 418 at any convenient location.

Referring back to FIG. 1, a sensor 118 may be coupled to the lines 104 to sense towing force on the paravanes 106 (which may be any of the paravanes 200 or 400, or any paravanes embodying characteristics of the paravanes 200 or 400), and the controller 412 may be coupled to the sensors 118, directly or through the master control system 120, to release drag-reducing fluid from the reservoirs of the paravanes in response to an unwanted rise in the towing force. Towing force can be controlled in this way to avoid a rapid spike that might sever, or otherwise compromise, any of the lines 104. The sensors 118 may also be coupled to the paravanes 106, or may couple the lines 104 to the paravanes 106. The sensors may be roller-type tension sensors, spring-type tension sensors, or piezoelectric devices incorporated in the foregoing sensors or applied directly to the lines 104 or paravanes 106 as films.

Referring back to FIG. 4A, a control valve 405 may be coupled to the conduits 406 (or conduit 406 if only one conduit is used), for example disposed in the conduits 406, to control flow of drag-reducing fluid to the foil 212. A controller 419 may be coupled to the control valve 405 by a control coupling 421, which may be a direct connection, such as a wire, or an indirect connection, such as a wireless connection. The control valve 405 may be used to increase, decrease, or stop flow of the drag-reducing fluid to the foil 212, as needed. In one instance, the controller 419 may receive a signal from the sensors 118, and may adjust flow of the drag-reducing fluid by manipulating the control valve 405. For example, the sensor 118 may sense an increase in towing force in a line 104, corresponding to a particular paravane 106. The controller 419 may determine that the towing force sensed by the sensor 118 in the line 104 is outside a tolerance, and may open the control valve 405 coupled to the corresponding paravane 106 to provide increased drag-reducing fluid to the paravane 106 to reduce the towing force. The sensor 118, controller 419, and control valve 405 may define a control loop that may be tuned to any desired gains, time constants, or other control parameters to respond quickly or slowly, as operating conditions warrant. For example, the control loop may be tuned to respond to spikes in towing force by surging flow of drag-reducing fluid to a paravane to prevent damage to a line 104 from a fast spike in towing force.

Figure 5:
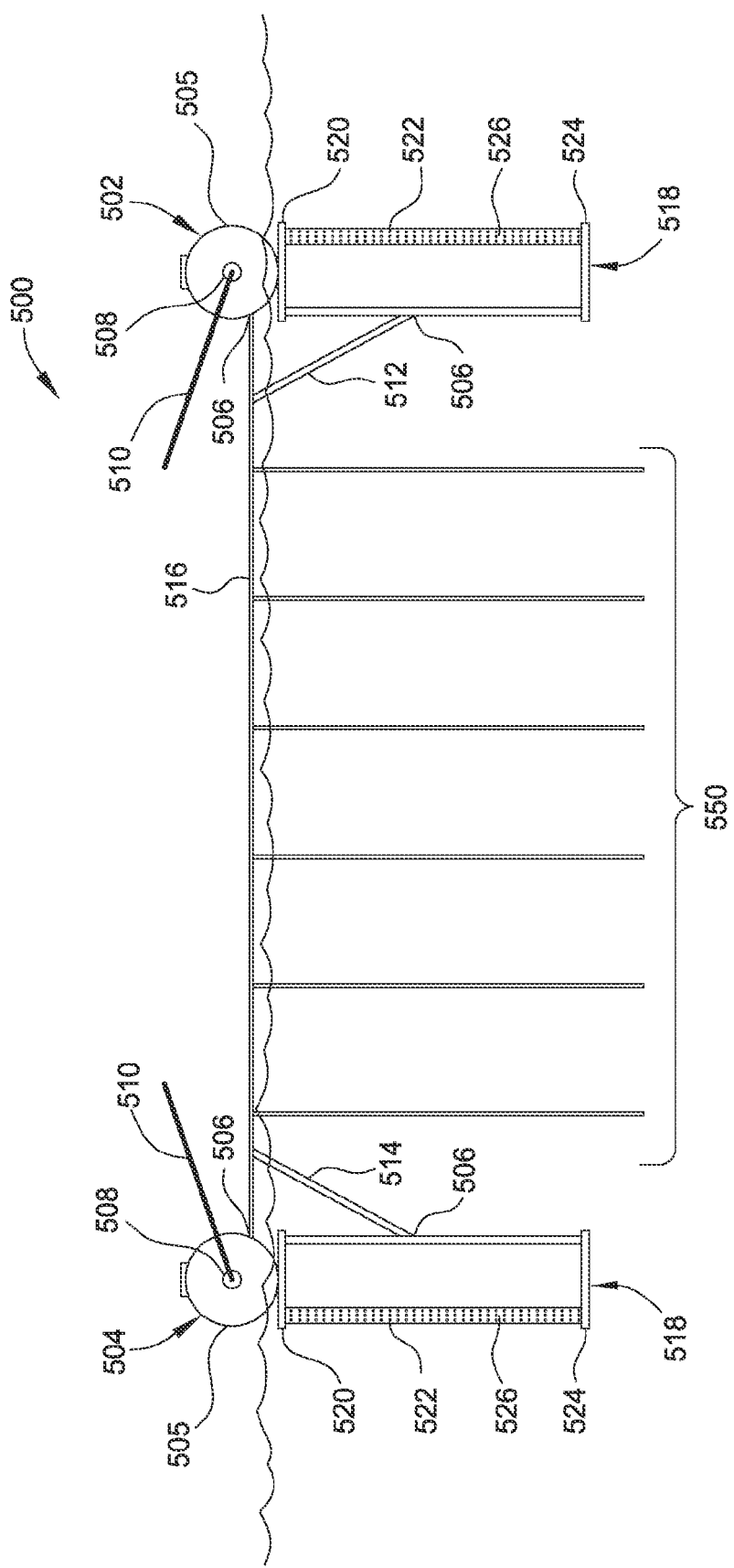
FIG. 5 is a system view of a paravane system according to another embodiment.

FIG. 5 is a system view of a paravane system 500 according to another embodiment. The paravane system 500 includes at least a first paravane 502 and a second paravane 504. Each of the first and second paravanes 502, 504 includes at least two fastening points 506, and a tow line coupling 508. A tow line 510 is shown coupled to each tow line coupling 508. A first harness 512 is coupled to the fastening points 506 of the first paravane 502, and a second harness 514 is coupled to the fastening points 506 of the second paravane 504. A spreader cable 516 is coupled between the first harness 512 and the second harness 514. FIG. 5 views the paravane system 500 from a viewpoint between the paravane system 500 and a vessel (not shown) towing the paravane system 500. The tow lines 510 generally couple the paravanes 502, 504 to a vessel, which in the view of FIG. 5 is located behind the viewer. A plurality of source and/or sensor assemblies 550 is shown coupled to and extending from the spreader cable 516 down into the water and away from the viewer into the distance.

The first and second paravanes 502, 504 may each be any of the paravanes described elsewhere herein, and may be the same or different. In FIG. 5, each of the paravanes 502, 504 has a float member 505 and a baffle 518 comprising a coupling member 520, one or more foils 522, for example a plurality of foils 522 (of which only one is visible in each of the paravanes 502, 504), and one or more end members 524. At least one of the foils 522 of each paravane 502, 504 has a plurality of openings 526 in a flow-facing side 528 of each foil. The foils 522 and openings 526 may be configured according to any of the embodiments described herein, or according to any variation thereof. In FIG. 5, the foils 522 are depicted as having a perforated fender for flowing drag reducing fluids through the fender of the foil. Each foil 522 of one paravane may have openings in the flow-facing side thereof, or a portion of the foils may have openings in the flow-facing side thereof. For example, in some embodiments, only a front-most foil of a paravane will have openings for drag reducing fluid.

As described above, the drag reducing fluid may be a gas, such as air, and may flow through conduits (not visible in FIG. 5) from a reservoir in the float member 505 of each paravane 502, 504, optionally through the foils 522 of the baffle 518. As also described above, a control valve (not visible in FIG. 5) may be disposed in the conduits to control flow of the drag reducing fluid. A controller may be coupled to each of the control valves, as described above, and each controller may communicate with a master controller aboard the vessel.

While the foregoing is directed to aspects of the present disclosure, other and further aspects of the disclosure may be devised without departing from the basic scope thereof, and the scope thereof is determined by the claims that follow.

What is claimed is:

1. A paravane, comprising:
   a float member;
   a baffle coupled to the float member, the baffle comprising one or more fluid ports disposed at a flow-facing side of the baffle; and
   a fluid source coupled to the baffle by a conduit, wherein at least a portion of the fluid ports are nozzles attached to the baffle.

2. The paravane of claim 1, wherein the fluid ports are disposed through a portion of the baffle.

3. The paravane of claim 1, wherein the fluid ports are disposed through a portion of the baffle and distributed along a length of the baffle.

4. The paravane of claim 1, wherein one or more of the fluid ports are aligned at an angle with respect to a flotation plane of the float member.

5. The paravane of claim 1, wherein the fluid ports are distributed unevenly along the baffle.

6. A paravane, comprising:
   a float member;
   a baffle coupled to the float member, the baffle comprising one or more fluid ports disposed at a flow-facing side of the baffle; and
   a fluid source coupled to the baffle by a conduit, wherein the fluid ports are a grill.

7. A paravane, comprising:
   a float member;
   a baffle coupled to the float member, the baffle comprising one or more fluid ports disposed at a flow-facing side of the baffle; and
   a fluid source coupled to the baffle by a conduit, wherein the fluid source comprises a reservoir inside the float member.

8. The paravane of claim 7, wherein the conduit is disposed through the baffle.

9. The paravane of claim 7, further comprising a support extending from the float member and coupled to the baffle, where the conduit is disposed through the support.

10. A paravane, comprising:
    a float member having a gas reservoir in an interior portion of the float member;
    a baffle coupled to the float member, the baffle comprising one or more gas ports disposed at a flow-facing side of the baffle; and
    a conduit coupling the gas reservoir to the gas ports.

11. The paravane of claim 10, wherein the gas ports are distributed along a length of the baffle.

12. The paravane of claim 10, wherein the gas ports are a grill.

13. The paravane of claim 10, wherein the conduit is a plenum inside the baffle.

14. The paravane of claim 13, further comprising a control valve disposed in the conduit and a controller coupled to the control valve.

15. The paravane of claim 10, wherein the gas ports are a plurality of nozzles.

16. The paravane of claim 15, further comprising a support extending from the float member and coupled to the baffle, where the conduit is disposed through the support.

17. The paravane of claim 16, further comprising a control valve disposed in the conduit and a controller coupled to the control valve.

18. A paravane, comprising:
    a float member having a gas reservoir in an interior portion of the float member;
    a baffle coupled to the float member, the baffle comprising one or more gas ports disposed at a flow-facing side of the baffle;
    a conduit coupling the gas reservoir to the gas ports;
    a control valve disposed in the conduit; and
    a controller coupled to the control valve.

19. The paravane of claim 18, wherein the conduit is a plenum inside the baffle.

20. A paravane system, comprising:
    a first paravane having a plurality of foils and at least two fastening points, at least one foil having a plurality of gas openings at a flow-facing side of the foil;
    a second paravane having a plurality of foils and at least two fastening points, at least one foil having a plurality of gas openings at a flow-facing side of the foil;
    a tow line coupled to each of the first and second paravanes;
    a first harness fastened to the fastening points of the first paravane;
    a second harness fastened to the fastening points of the second paravane; and
    a spreader cable attached between the first and second harnesses.

21. The paravane system of claim 20, wherein each of the first and second paravanes includes a gas source coupled to the gas openings by a conduit routed through each foil.

22. The paravane system of claim 21, wherein each gas source includes a control valve disposed in a conduit of the gas source.

23. The paravane system of claim 22, further comprising a controller coupled to each control valve.

24. The paravane system of claim 21, wherein each of the first and second paravanes comprises a float member coupled to the plurality of foils, and each gas source comprises a reservoir disposed inside the respective float members.

* * * * *